United States Patent
Setlak (10) Patent No.: US 9,517,022 B2
(45) Date of Patent: Dec. 13, 2016

(54) FINGER BIOMETRIC SENSOR INCLUDING MAGNETIC FIELD FINGER BIOMETRIC SENSING PIXELS AND RELATED METHODS

(71) Applicant: APPLE INC., Cupertino, CA (US)

(72) Inventor: Dale R. Setlak, Melbourne, FL (US)

(73) Assignee: APPLE INC., Cupertino, CA (US)

( * ) Notice: Subject to any disclaimer, the term of this patent is extended or adjusted under 35 U.S.C. 154(b) by 219 days.

(21) Appl. No.: 13/944,326

(22) Filed: Jul. 17, 2013

(65) Prior Publication Data
US 2014/0021946 A1 Jan. 23, 2014

Related U.S. Application Data

(60) Provisional application No. 61/673,793, filed on Jul. 20, 2012.

(51) Int. Cl.
*A61B 5/117* (2016.01)
*G06K 9/00* (2006.01)

(52) U.S. Cl.
CPC ........... *A61B 5/117* (2013.01); *G06K 9/00006* (2013.01); *G06K 9/0012* (2013.01)

(58) Field of Classification Search
CPC ................ A61B 5/117–5/1174; G06K 9/0006; G06K 9/00013; G06K 9/0002; G06K 9/0012; G06K 9/00006; G06K 9/00906; G01N 27/904; G01N 27/9033; G01N 27/90; G06F 21/32
USPC .......... 324/226–263; 382/124–126; 455/410, 455/411, 456.1; 340/5.53
See application file for complete search history.

(56) References Cited

U.S. PATENT DOCUMENTS

| | | | |
|---|---|---|---|
| 5,526,701 A | 6/1996 | Tamori | |
| 5,659,248 A * | 8/1997 | Hedengren | ........ G01N 27/9013 324/232 |
| 5,940,526 A | 8/1999 | Setlak | |
| 6,507,662 B1 * | 1/2003 | Brooks | .................... G06K 9/00 340/5.52 |

(Continued)

FOREIGN PATENT DOCUMENTS

| | | |
|---|---|---|
| EP | 1626330 A1 | 2/2006 |
| JP | 2009210399 | 9/2009 |
| WO | 0120538 | 3/2001 |

OTHER PUBLICATIONS

Garcia-Martin et al., "Non-destructive techniques based on eddy current testing", Sensors, vol. 11, www.mdpi.com/journal/sensors, Feb. 2011, pp. 2525-2565.

(Continued)

*Primary Examiner* — Arleen M Vazquez
*Assistant Examiner* — Lee Rodak
(74) *Attorney, Agent, or Firm* — Allen, Dyer, Doppelt, Milbrath & Gilchrist, P.A.

(57) ABSTRACT

A finger biometric sensor may include a substrate and an array of magnetic field finger biometric sensing pixels carried by the substrate. The finger biometric sensor may also include processing circuitry coupled to the array of magnetic field finger biometric sensing pixels and capable of generating a magnetic field extending into a finger positioned adjacent the array of magnetic field finger biometric sensing pixels to cause eddy currents in the finger. The processing circuitry may also be capable of sensing a counter magnetic field caused by the eddy currents representative of at least one finger biometric characteristic.

34 Claims, 7 Drawing Sheets

(56) References Cited

U.S. PATENT DOCUMENTS

| | | | |
|---|---|---|---|
| 6,822,443 B1 | 11/2004 | Dogaru | |
| 7,077,010 B2 | 7/2006 | Ganapathi | |
| 7,605,709 B2 | 10/2009 | Tolliver | |
| 8,363,028 B2 | 1/2013 | Antaki | |
| 2009/0273342 A1* | 11/2009 | Drummy | G01N 27/90 324/238 |
| 2012/0085822 A1* | 4/2012 | Setlak | G06K 9/605 235/439 |
| 2012/0206132 A1* | 8/2012 | Lepage | G01N 27/9033 324/239 |
| 2013/0181701 A1* | 7/2013 | Galbraith | G01N 27/90 324/232 |

OTHER PUBLICATIONS

Marinova et al., "Modeling and measurement system for magnetic field distributions in biological structures", International Journal on Smart Sensing and Intelligent Systems, Massey University, New Zealand, vol. 2, No. 2, Jun. 2009, pp. 262-278.

Smith et al., "Chip-size magnetic sensor arrays", Internet citation, retrieved from the Internet, http://www.nve.com/downloads/expo02.pd, May 2002, pp. 1-11.

* cited by examiner

FINGER BIOMETRIC SENSOR INCLUDING MAGNETIC FIELD FINGER BIOMETRIC SENSING PIXELS AND RELATED METHODS

FIELD OF THE INVENTION

The present invention relates to the field of electronics, and, more particularly, to electronic devices including finger biometric sensors and related methods.

BACKGROUND

Measuring patterns in biological tissues, such as, for example, the ridge and valley patterns in fingerprints has been performed using a variety of forms of energy ranging from optical energy to ultrasonic energy to electric field energy. Each of these methods may have advantages and disadvantages. For example, such methods may include the use of optical measurements, electrical capacitance measurements, pressure measurements, thermal measurements, ultrasonic measurements, and electric field measurements The structure of human skin includes several layers, the outermost layer of which is an electrical insulator or a dielectric layer called the stratum corneum. Underneath the insulating layer is an electrically conductive layer. A fingerprint sensor, for example, an electric field based fingerprint sensor, uses electric fields to capture the shape of the electrically conductive layer. Images of the fingerprint ridge pattern are generated based upon the captured shape of the electrically conductive layer.

SUMMARY

A finger biometric sensor may include a substrate and an array of magnetic field finger biometric sensing pixels carried by the substrate. The finger biometric sensor may also include processing circuitry coupled to the array of magnetic field finger biometric sensing pixels and capable of generating a magnetic field extending into a finger positioned adjacent the array of magnetic field finger biometric sensing pixels to cause eddy currents in the finger. The processing circuitry may also be capable of sensing a counter magnetic field caused by the eddy currents representative of at least one finger biometric characteristic. Accordingly, the finger biometric sensor may measure a finger biometric characteristic using less complex and more efficient circuitry, for example, as compared to electric field sensing pixels and/or optical pixels.

The array of magnetic field sensing finger biometric pixels may each include at least one electrically conductive coil. For example, the at least one electrically conductive coil may include a driving coil, and the processing circuitry may be capable of generating the magnetic field via the driving coil. The at least one electrically conductive coil may also include a sensing coil, and the processing circuitry may be capable of sensing the counter magnetic field via the sensing coil, for example.

The array of magnetic field sensing finger biometric pixels may each include a magnetic shield associated with the at least one coil, for example. The processing circuitry may include an alternating current generator capable of generating an alternating current in the at least one coil. The processing circuitry may also include a sensing device capable of sensing a phase difference between the alternating current and a voltage of the at least one coil.

The array of magnetic field sensing finger biometric pixels may each comprises a magnetoresistive sensor, and the processing circuitry may be capable of sensing the counter magnetic field via the magnetoresistive sensor, for example. In other embodiments, the array of magnetic field sensing finger biometric pixels may each include a Hall effect sensor, and the processing circuitry may be capable of sensing the counter magnetic field via the Hall effect sensor. The finger biometric sensor may further include a non-magnetic, dielectric material layer over the array of magnetic field sensing finger biometric pixels, for example.

An electronic device aspect is directed to an electronic device and may include a portable housing and wireless transceiver carried by the portable housing. The electronic device may also include a finger biometric sensor carried by the portable housing that may include a substrate and an array of magnetic field finger biometric sensing pixels carried by the substrate. The finger biometric sensor may also include processing circuitry coupled to the array of magnetic field finger biometric sensing pixels and capable of generating a magnetic field extending into a finger positioned adjacent the array of magnetic field finger biometric sensing pixels to cause eddy currents in the finger. The processing circuitry may also be capable of sensing a counter magnetic field caused by the eddy currents representative of at least one finger biometric characteristic.

A method aspect is directed to a method of sensing at least one finger biometric characteristic that may include generating, using processing circuitry, a magnetic field extending into a finger positioned adjacent an array of magnetic field finger biometric sensing pixels to cause eddy currents in the finger. The method may further include sensing, using the processing circuitry, a counter magnetic field caused by the eddy currents representative of the at least one finger biometric characteristic.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime and multiple prime notation is used for like elements in different embodiments.

Figure 1:
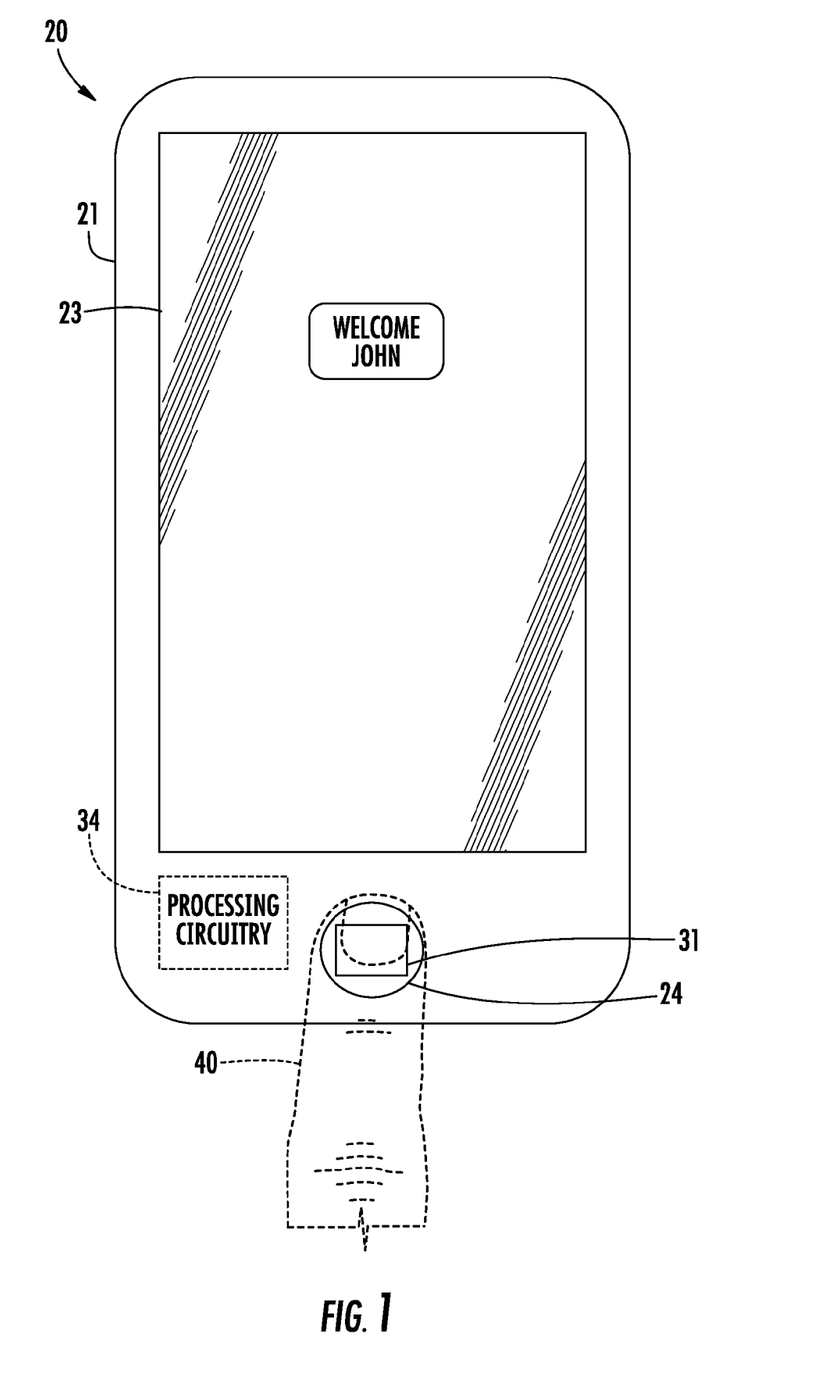
FIG. 1 is a plan view of an electronic device according to the present invention.
Figure 2:
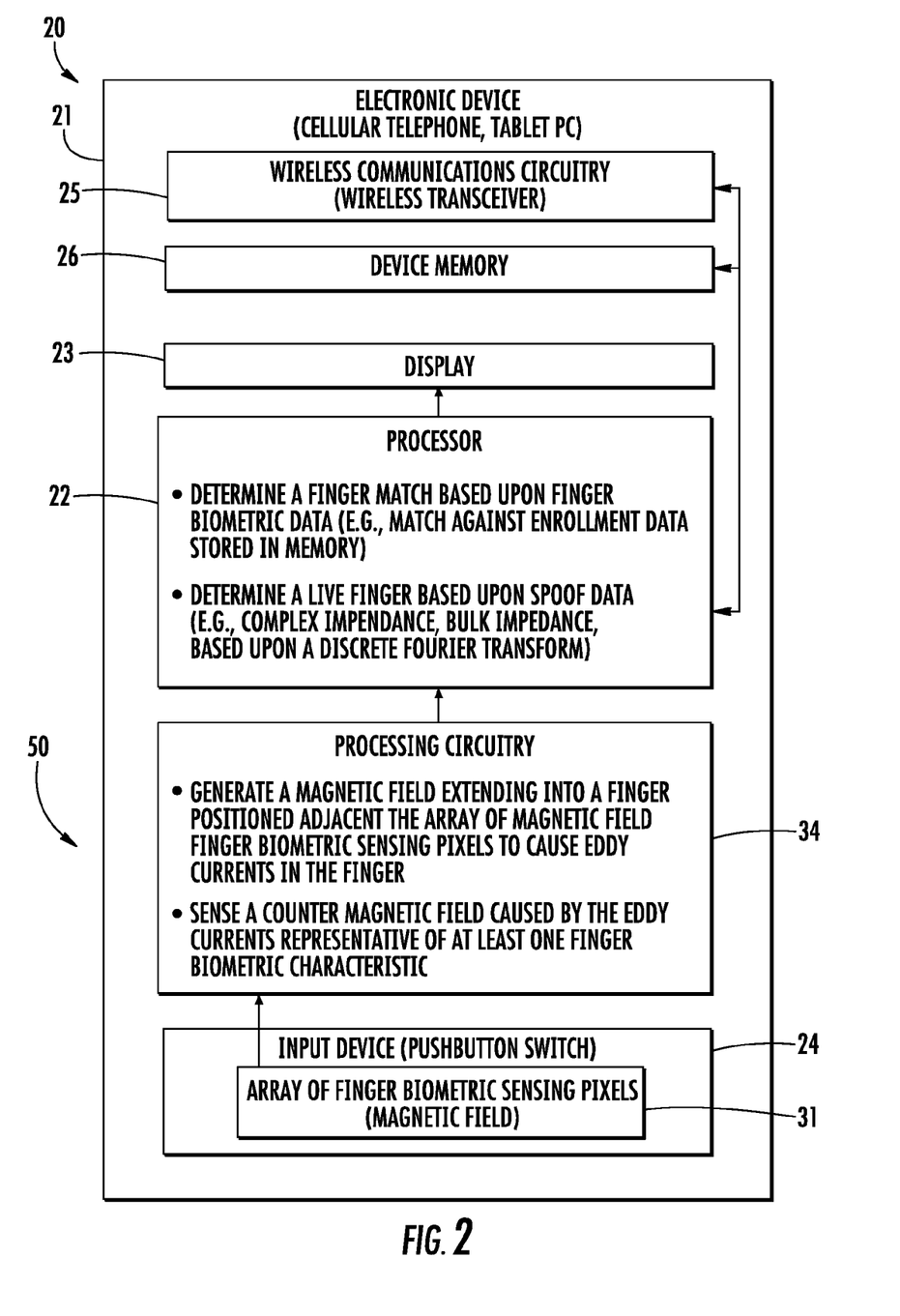
FIG. 2 is a schematic block diagram of the electronic device of FIG. 1.

Referring initially to FIGS. 1-2, an electronic device 20 is now described. The electronic device 20 illustratively includes a portable housing 21 and a processor 22, for example a host processor, carried by the portable housing. The electronic device 20 is illustratively a mobile wireless communications device, for example, a cellular telephone. The electronic device 20 may be another type of electronic device, for example, a tablet computer, laptop computer, etc.

Wireless communications circuitry 25 (e.g. a wireless transceiver, cellular, WLAN Bluetooth, etc.) is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25.

A display 23 is also carried by the portable housing 21 and is coupled to the processor 22. The display 23 may be a liquid crystal display (LCD), for example, a touch screen display, or may be another type of display, as will be appreciated by those skilled in the art. A device memory 26 is also coupled to the processor 22.

A finger-operated user input device, illustratively in the form of a pushbutton switch 24, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device may be a different type of finger-operated user input device, for example, forming part of a touch screen display. Other or additional finger-operated user input devices may be carried by the portable housing 21.

The electronic device 20 includes a finger biometric sensor 50, which may be in the form of one or more integrated circuits (ICs). The finger biometric sensor 50 includes an array of magnetic field finger biometric sensing pixels 31 that are part of an IC carried by the pushbutton switch 24 to sense a user's finger 40 or an object placed adjacent the array of magnetic field finger biometric sensing pixels.

The finger biometric sensor 50 also includes processing circuitry 34 coupled to the array of magnetic field finger biometric sensing pixels 31. The array of magnetic field finger biometric sensing pixels 31 is carried by the pushbutton switch 24 so that when a user or object contacts and/or presses downward on the pushbutton switch, the processing circuitry 34 cooperates with the array so that image data from the user's finger 40 is acquired, for example, finger image data for finger matching and/or spoof detection, as will be appreciated by those skilled in the art.

In other words, the array of magnetic field finger biometric sensing pixels 31 may cooperate with the processing circuitry 34 to be responsive to static contact or placement of the user's finger 40 or object. Of course, in other embodiments, for example, where the array of magnetic field finger biometric sensing pixels 31 is not carried by a pushbutton switch, the array of magnetic field finger biometric sensing pixels may cooperate with the processing circuitry 34 to be responsive to sliding contact (i.e. a slide sensor), or responsive to static placement (i.e. a standalone static placement sensor).

The processing circuitry 34 generates a magnetic field extending into a finger positioned adjacent the array of magnetic field finger biometric sensing pixels to cause eddy currents in the finger. The processing circuitry 34 also senses a counter magnetic field caused by the eddy currents representative of at least one finger biometric characteristic, as will be described in further detail below.

The processor 22 may also cooperate with the array of magnetic field finger biometric sensing pixels 31 to determine a finger match based upon finger biometric data. More particularly, the processor 22 may determine a finger match based upon enrollment data stored in the device memory 26. The processor 22 may also determine a live finger based upon spoof data. More particularly, the processor 22 may determine a live finger based upon a complex impedance and/or bulk impedance measurement.

In some embodiments, the processor 22 may cooperate with the array of magnetic field finger biometric sensing pixels 31 to perform a navigation function, for example. Of course the processor 22 may cooperate with the array of magnetic field finger biometric sensing pixels 31 and/or other circuitry to perform other or additional functions, as will be appreciated by those skilled in the art.

It should be understood that in some embodiments, the processing circuitry 34 may be part of or included in the processor 22. In other words, the functionality described herein with respect to the processing circuitry 34 may be performed by the processor 22, another processor, or shared between or among processors.

Figure 3:
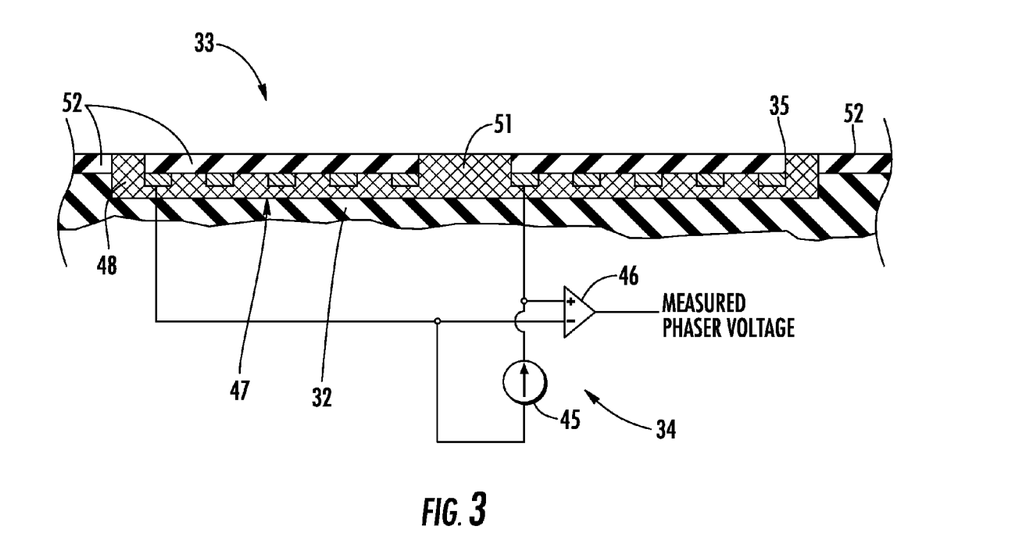
FIG. 3 is a schematic cross-sectional view of the finger biometric sensor of FIG. 2.

Referring now additionally to FIG. 3, the array of magnetic field sensing finger biometric pixels 31 is carried by a substrate 32, and each magnetic field sensing finger biometric pixel 33 includes an electrically conductive coil 35. More particularly, each pixel 33 includes an electrically conductive coil 35. The processing circuitry 34 generates the magnetic field via the electrically conductive coil 35 and also senses the counter magnetic field via the electrically conductive coil. More particularly, processing circuitry 34 includes an alternating current generator 45 that generates an alternating current in the electrically conductive coil 35. The processing circuitry 34 also includes a sensing device 46 that senses a phase difference between the alternating current and a voltage of the electrically conductive coil 35. The sensing device 46 may be an amplifier, for example, a differential amplifier. The sensing device 46 may sense a phase difference between the alternating current and the voltage of the electrically conductive coil 35, as will be explained in further detail below. Of course, other sensing devices and/or techniques may be used.

Each magnetic field sensing finger biometric pixel 33 also includes a magnetic shield 47 associated with the respective electrically conductive coils 35. For example, the magnetic shield 47 may be a film of magnetic material, such as, for example, a ferrite material. The magnetic shield 47 may be placed behind each of the electrically conductive coils 35, and may include a side shield portion 48 that is between adjacent electrically conductive coils (i.e., between adjacent pixels 33). For example, a string of pseudo-vias may be formed from the magnetic material to focus the magnetic field on the intended finger skin and to reduce inter-pixel cross talk.

A center post 51 of the magnetic shield 47 through the center of each electrically conductive coil 35 may be fabricated in a similar fashion, as will be appreciated by those skilled in the art. The magnetic field may then be constrained to the area of the magnetic shield 47 on the bottom and sides of each electrically conductive coil 35. The magnetic field projects upward from the unshielded side of each electrically conductive coil 35, where the finger 40 can be placed into the magnetic field for sensing and measurement. The magnetic shield 47 may make the finger biometric sensor 50 increasingly sensitive to materials placed on top of the unshielded face of each electrically conductive coil 35, and less sensitive to materials placed behind or to the side of each electrically conductive coil.

The finger biometric sensor 50 also includes a non-magnetic, dielectric material layer 52 over the array of magnetic field sensing finger biometric pixels 31. The non-magnetic, dielectric material layer 52 may provide increased protection or an interface between the finger 40 and the electrically conductive coils 35.

In operation, the AC generator 45 generates an AC in each electrically conductive coil 35. The positioning of the electrically conductive coils 35 relative to the finger 40 induces relatively small eddy currents in the finger, and, more particularly, within the conductive structures within the finger. The eddy currents generate the counter magnetic fields, which are measured. The strength of the counter field is related to the conductivity of the eddy current region and the distance between the conductive eddy current region and the electrically conductive coils 35. In regions of the fingerprint ridge, for example, the conductive region is closer to the electrically conductive coils 35, and the eddy currents produce a stronger reverse magnetic field. In regions of the fingerprint valley, for example, the conductive region is farther away from the electrically conductive coils 35 and generates a weaker reverse magnetic field. The reverse magnetic field generated by the eddy currents can be measured in the form of a reverse electromotive force (EMF) across each electrically conductive coil 35.

With respect to signal processing, sine wave excitation, via the AC generator 45, may be used, and the measured signals analyzed, via the sensing device 46, for magnitude and phase. In this type of signal processing, the complex impedance of the system changes when the conductivity or distance to the conductive target, i.e. the conductive layer with the finger 40, changes. Alternatively, multiple frequencies may be applied and measured using other techniques, for example, pulse-type excitation, chirp excitation, or other complex waveforms, as will be appreciated by those skilled in the art. Measured response waveforms resulting from this type of complex excitation may be analyzed to produce multiple types of information about the target material.

With respect to detecting the conductive structures below the skin, while magnetic fields induce eddy currents in adjacent conductive structures of the finger 40, those fields are not blocked by simple conductive structures, for example, ridges and valleys, and may penetrate some distance into the finger, i.e., beyond the first conductive layer of the skin. For example, the eddy current measurements may also be used to detect subsurface defects in conductive metals. This property of magnetic fields allows a finger biometric sensor based on a magnetic field to detect structures defined by changes in conductivity that are beneath the first conductive layer of the finger. Under certain operating conditions, vascular system structures and other structures having distinct electrical conductivity may be detected by magnetic field sensitive devices, as will be appreciated by those skilled in the art.

Figure 4:
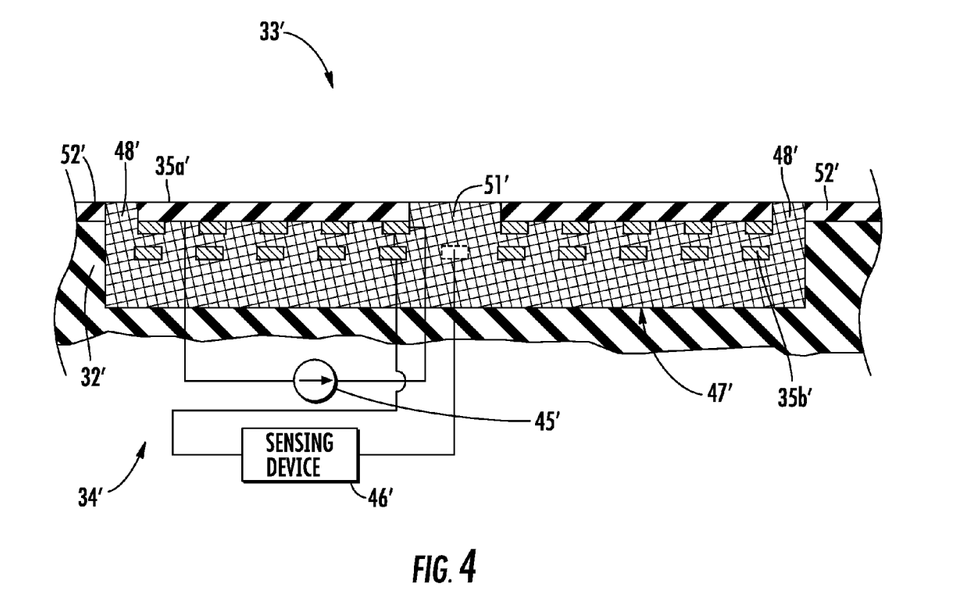
FIG. 4 is a schematic cross-sectional view of a finger biometric sensor in accordance with another embodiment.

Referring now additionally to FIG. 4, in another embodiment, the array of magnetic field sensing finger biometric pixels 31' each includes a driving coil 35a' and a sensing coil 35b'. The processing circuitry 34' generates the magnetic field via the driving coil 35a'. In particular, the AC generator 45' generates an alternating current in the driving coil 35a'. The sensing device 46' of the processing circuitry 34' senses the counter magnetic field via the sensing coil 35b'. The use of a driving coil 35a' and a sensing coil 35b' advantageously may allow each of the electrically conductive coils to be optimized for its specific task. However, this may increase complexity and fabrication difficulty.

Figure 5:
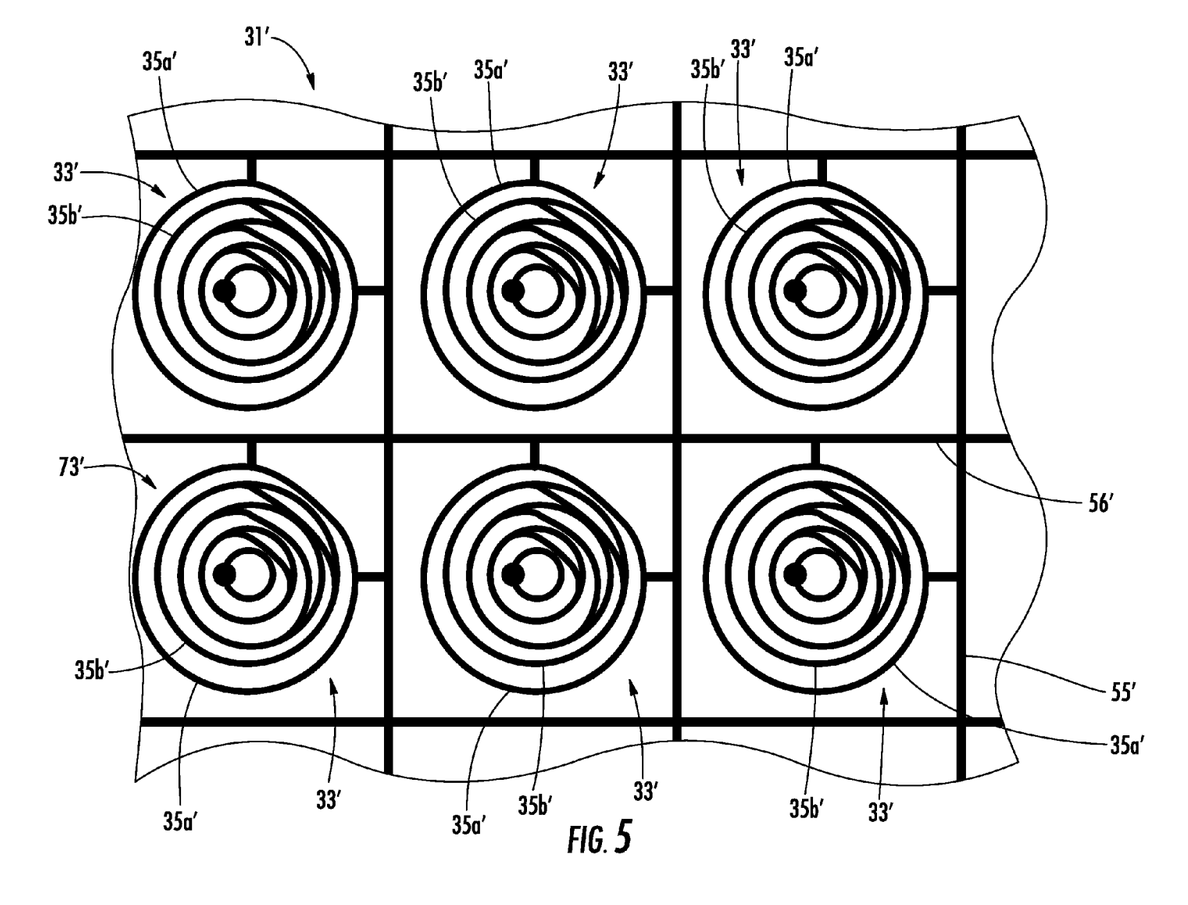
FIG. 5 is a schematic diagram of a coupling arrangement of the electrically conductive coils of FIG. 4.

Referring now additionally to FIG. 5, addressing of the electrically conductive coils 35a', 35b' in the array 31' can be performed via a matrix using row and column busses 55', 56' connected to the tops and bottoms of the electrically conductive coils 35a', 35b'. By using a matrix, for example, the number of interconnects between the array of magnetic field finger biometric sensing pixels 33' and the active circuitry, i.e. the processing circuitry 34', for an array of n rows and m columns is n+m. In contrast, arrays that cannot be addressed as a matrix require n*m interconnects or alternatively an active signal multiplexing capability on the coil side of the interconnects, for example.

Figure 6:
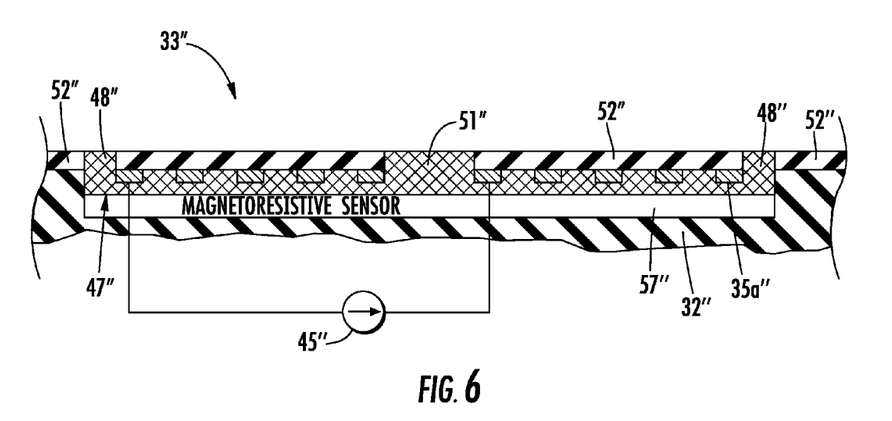
FIG. 6 is a schematic cross-sectional view of a finger biometric sensor in accordance with another embodiment.

Referring now to FIG. 6, in yet another embodiment, each magnetic field sensing finger biometric pixel 33" includes a magnetoresistive sensor 57", for example, instead of a sensing coil. The processing circuitry 34" senses the counter magnetic field via the magnetoresistive sensor 57". For example, the magnetoresistive sensor 57" may be a giant magnetoresistance (GMR) sensor and include alternating ferromagnetic and non-magnetic conductive layers for sensing the counter magnetic field. Each magnetic field sensing finger biometric pixel 33" may also include a driving coil 35a" coupled to the processing circuitry 34" for generating the magnetic field that extends into the finger 40". Of course, other or additional techniques or devices may be used to drive or generate the magnetic field that extends into the finger 40".

Figure 7:
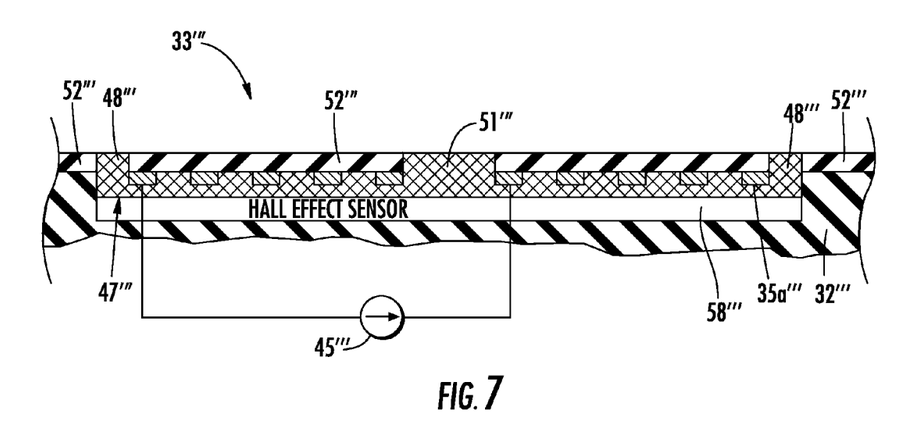
FIG. 7 is a schematic cross-sectional view of a finger biometric sensor in accordance with another embodiment.

Referring now to FIG. 7, in yet a further embodiment, the array of magnetic field sensing finger biometric pixels 31''' each includes a Hall effect sensor 57''', for example, instead of a sensing coil. The processing circuitry 34''' senses the counter magnetic field via the Hall effect sensor 57'''. Each magnetic field sensing finger biometric pixel 33''' may also include a driving coil 35a''' coupled to the processing circuitry 34''' for generating the magnetic field that extends into the finger 40'''. Of course, other or additional techniques or devices may be used to drive ox generate the magnetic field that extends into the finger 40'''.

While the finger biometric sensor 50 has been described herein with respect to an array of magnetic field finger biometric sensing pixels 31, it will be appreciated by those skilled in the art, that the finger biometric sensor may also include electric field sensing pixels for detecting the conductive area of the finger 40. In some embodiments, the magnetic field finger biometric sensing pixels and the electric field sensing pixels may be both included within the same pixel structure. Where, for example, the array of magnetic field sensing finger biometric pixels 31 includes electrically conductive coils 35, the electrically conductive coils may be for magnetic eddy current imaging as described above, and also as electric field pixels for measuring quasi-static electric fields. In this case each electrically conductive coil may be configured to act as a TruePrint® style electric field pickup plate, for example, along the lines described in U.S. Pat. No. 5,940,526 to Setlak et al., assigned to the present assignee, and the entire contents of which are herein incorporated by reference. The use of two dissimilar measurements may make increasingly difficult to pass a spoof finger on the finger biometric sensor, for example, using fake finger materials, as will be appreciated by those skilled in the art. Additionally, such a finger biometric sensor may generate higher quality and more detailed images of the finger structures.

Additionally, the finger biometric sensor 50 advantageously provides a technique for measuring ridge and valley contours of the conductive layer of the finger 40 by using a passive finger sensing platen or area, for example, driven by a relatively economically sized active circuit device or processing circuitry 34. Moreover, the finger sensing area of the finger biometric sensor 50 may be flexible to conform to a variety of surface shapes. Still further, as noted above, addressing circuitry may be reduced since active signal multiplexing may not be desirable for use with the interface conductors. In other words, a relatively large array may be addresses using less addressing circuitry. Even still further, the finger biometric sensor 50 may also advantageously capture other or additional information about the blood circulatory system within the finger 40.

A method aspect is directed to a method of a method of sensing at least one finger biometric characteristic. The method includes generating, using processing circuitry 34, a magnetic field extending into a finger 40 positioned adjacent an array of magnetic field finger biometric sensing pixels 31 to cause eddy currents in the finger. The method also includes sensing, using the processing circuitry 34, a counter magnetic field caused by the eddy currents representative of the at least one finger biometric characteristic.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensor comprising:
    a substrate;
    an array of magnetic field finger biometric sensing pixels carried by the substrate; and
    processing circuitry coupled to the array of magnetic field finger biometric sensing pixels and capable of
        generating, via at least one magnetic field finger biometric sensing pixel of the array thereof, a magnetic field extending into a finger positioned adjacent the array of magnetic field finger biometric sensing pixels to cause eddy currents in the finger, and
        sensing, via at least one magnetic field finger biometric sensing pixel of the array thereof, a counter magnetic field caused by the eddy currents based upon ridges and valleys of the finger for performing at least one authentication function.

2. The finger biometric sensor of claim 1, wherein the array of magnetic field sensing finger biometric pixels each comprises at least one electrically conductive coil.

3. The finger biometric sensor of claim 2, wherein the at least one electrically conductive coil comprises a driving coil; and wherein the processing circuitry is capable of generating the magnetic field via the driving coil.

4. The finger biometric sensor of claim 2, wherein the at least one electrically conductive coil comprises a sensing coil; and wherein the processing circuitry is capable of sensing the counter magnetic field via the sensing coil.

5. The finger biometric sensor of claim 2, wherein the array of magnetic field sensing finger biometric pixels each comprises a magnetic shield associated with the at least one coil.

6. The finger biometric sensor of claim 2, wherein the processing circuitry comprises:
    an alternating current generator capable of generating an alternating current in the at least one coil; and
    a sensing device capable of sensing a phase difference between the alternating current and a voltage of the at least one coil.

7. The finger biometric sensor of claim 1, wherein the array of magnetic field sensing finger biometric pixels each comprises a magnetoresistive sensor; and wherein the processing circuitry is capable of sensing the counter magnetic field via the magnetoresistive sensor.

8. The finger biometric sensor of claim 1, wherein the array of magnetic field sensing finger biometric pixels each comprises a Hall effect sensor; and wherein the processing circuitry is capable of sensing the counter magnetic field via the Hall effect sensor.

9. The finger biometric sensor of claim 1, further comprising a non-magnetic, dielectric material layer over the array of magnetic field sensing finger biometric pixels.

10. A finger biometric sensor comprising:
    a substrate;
    an array of magnetic field finger biometric sensing pixels carried by the substrate, each of the magnetic field finger biometric sensing pixels comprising at least one electrically conductive coil;
    a non-magnetic, dielectric material layer over the array of magnetic field sensing finger biometric pixels; and
    processing circuitry coupled to the array of magnetic field finger biometric sensing pixels and capable of
        generating, via at least one magnetic field finger biometric sensing pixel of the array thereof, a magnetic field extending into a finger positioned adjacent the array of magnetic field finger biometric sensing pixels to cause eddy currents in the finger, and
        sensing, via at least one magnetic field finger biometric sensing pixel of the array thereof, a counter magnetic field caused by the eddy currents based upon ridges and valleys of the finger for performing at least one authentication function.

11. The finger biometric sensor of claim 10, wherein the at least one electrically conductive coil comprises a driving coil; and wherein the processing circuitry is capable of generating the magnetic field via the driving coil.

12. The finger biometric sensor of claim 10, wherein the at least one electrically conductive coil comprises a sensing coil; and wherein the processing circuitry is capable of sensing the counter magnetic field via the sensing coil.

13. The finger biometric sensor of claim 10, wherein the array of magnetic field sensing finger biometric pixels each comprises a magnetic shield associated with the at least one coil.

14. The finger biometric sensor of claim 10, wherein the processing circuitry comprises:
    an alternating current generator capable of generating an alternating current in the at least one coil; and
    a sensing device capable of sensing a phase difference between the alternating current and a voltage of the at least one coil.

15. The finger biometric sensor of claim 10, wherein the array of magnetic field sensing finger biometric pixels each comprises a magnetoresistive sensor; and wherein the processing circuitry is capable of sensing the counter magnetic field via the magnetoresistive sensor.

16. The finger biometric sensor of claim 10, wherein the array of magnetic field sensing finger biometric pixels each comprises a Hall effect sensor; and wherein the processing circuitry is capable of sensing the counter magnetic field via the Hall effect sensor.

17. An electronic device comprising:
a portable housing;
a wireless transceiver carried by the portable housing;
a finger biometric sensor carried by the portable housing and comprising
a substrate,
an array of magnetic field finger biometric sensing pixels carried by the substrate, and
processing circuitry coupled to the array of magnetic field finger biometric sensing pixels and capable of
generating, via at least one magnetic field finger biometric sensing pixel of the array thereof, a magnetic field extending into a finger positioned adjacent the array of magnetic field finger biometric sensing pixels to cause eddy currents in the finger, and
sensing, via at least one magnetic field finger biometric sensing pixel of the array thereof, a counter magnetic field caused by the eddy currents based upon ridges and valleys of the finger for performing at least one authentication function.

18. The electronic device of claim 17, wherein the array of magnetic field sensing finger biometric pixels each comprises at least one electrically conductive coil.

19. The electronic device of claim 18, wherein the at least one electrically conductive coil comprises a driving coil; and wherein the processing circuitry is capable of generating the magnetic field via the driving coil.

20. The electronic device of claim 18, wherein the at least one electrically conductive coil comprises a sensing coil; and wherein the processing circuitry is capable of sensing the counter magnetic field via the sensing coil.

21. The electronic device of claim 18, wherein the array of magnetic field sensing finger biometric pixels each comprises a magnetic shield associated with the at least one coil.

22. The electronic device of claim 17, wherein the array of magnetic field sensing finger biometric pixels each comprises a magnetoresistive sensor; and wherein the processing circuitry is capable of sensing the counter magnetic field via the magnetoresistive sensor.

23. The electronic device of claim 17, wherein the array of magnetic field sensing finger biometric pixels each comprises a Hall effect sensor; and wherein the processing circuitry is capable of sensing the counter magnetic field via the Hall effect sensor.

24. The electronic device of claim 17, further comprising a non-magnetic, dielectric material layer over the array of magnetic field sensing finger biometric pixels.

25. The electronic device of claim 17, further comprising at least one input device carried by the portable housing and carrying the array of magnetic field finger biometric sensing pixels.

26. The electronic device of claim 25, wherein the at least one input device comprises a pushbutton switch.

27. A method of sensing a finger comprising:
generating, using processing circuitry via at least one magnetic field finger biometric sensing pixel of the array thereof, a magnetic field extending into the finger positioned adjacent an array of magnetic field finger biometric sensing pixels to cause eddy currents in the finger; and
sensing, using the processing circuitry via at least one magnetic field finger biometric sensing pixel of the array thereof, a counter magnetic field caused by the eddy currents based upon ridges and valleys of the finger for performing at least one authentication function.

28. The method of claim 27, wherein the array of magnetic field sensing finger biometric pixels each comprises at least one electrically conductive coil.

29. The method of claim 28, wherein the at least one electrically conductive coil comprises a driving coil; and wherein generating the magnetic field comprises generating the magnetic field via the driving coil.

30. The method of claim 28, wherein the at least one electrically conductive coil comprises a sensing coil; and wherein sensing the counter magnetic field comprises sensing the counter magnetic field via the sensing coil.

31. The method of claim 28, wherein the array of magnetic field sensing finger biometric pixels each comprises a magnetic shield associated with the at least one coil.

32. The method of claim 28, wherein using the processing circuitry comprises:
generating an alternating current, using an alternating current generator, in the at least one coil; and
sensing a phase difference, between the alternating current and a voltage of the at least one coil.

33. The method of claim 27, wherein the array of magnetic field sensing finger biometric pixels each comprises a magnetoresistive sensor; and wherein sensing the counter magnetic field comprises sensing the counter magnetic field via the magnetoresistive sensor.

34. The method of claim 27, wherein the array of magnetic field sensing finger biometric pixels each comprises a Hall effect sensor; and wherein sensing the counter magnetic field comprises sensing the counter magnetic field via the Hall effect sensor.

* * * * *